Feb. 15, 1966 G. W. MESZAROS ET AL 3,235,818
HIGH-SPEED TRANSISTOR INVERTER WITH SWITCHING CONTROL TRANSISTORS
Filed April 12, 1963
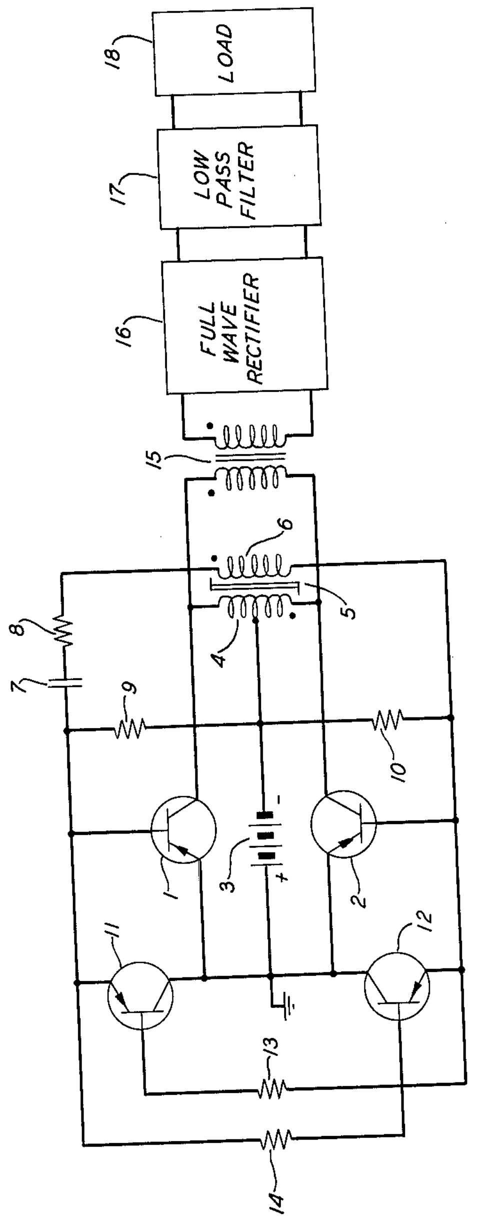
INVENTORS G. W. MESZAROS
P. W. USSERY
BY R. B. Anderson
ATTORNEY 3,235,818

HIGH-SPEED TRANSISTOR INVERTER WITH SWITCHING CONTROL TRANSISTORS

George W. Meszaros, New York, N.Y., and Paul W. Ussery, Livingston, N.J., assignors to Bell Telephone Laboratories, Incorporated, New York, N.Y., a corporation of New York Filed Apr. 12, 1963, Ser. No. 272,581
2 Claims. (Cl. 331—113)

This invention relates generally to inverters and more particularly, although in its broader aspects not exclusively, to transistor inverters which are intended for use in so-called direct-current converters.

In the usual direct-current converter, an inverter is employed to change a direct-current input to an alternating-current wave which can readily be transformed to a different voltage level. The resulting alternating-current wave is then rectified and filtered to provide a steady direct-current output. In general, it is desirable that the frequency of the alternating-current wave produced by the inverter be as high as possible in order to permit the circuit components of the filter to be relatively small in their physical dimensions. In practice, however, there are other factors which tend to limit that frequency to a value lower than might otherwise be employed.

One commonly used inverter makes use of a pair of alternately conducting power transistors connected to pass current from a direct-current source through the primary winding of a feedback transformer in respectively opposite directions. Either transformer saturation characteristics, separate timing components in one or more positive feedback paths from the transformer secondary winding to the power transistors, or a combination of both control the switching frequency of the power transistors and, hence, the frequency of the alternating-current output wave. In at least one version, illustrated for example in U.S. Patent 3,159,800, which issued December 1, 1964, to R. P. Massey, a separate diode is connected in parallel with the emitter-base path of each of the power transistors to hold its respective power transistor in the non-conducting state while the other power transistor is conducting. Even so, each power transistor tends to continue to conduct for a short interval after the other has switched to its conducting state. The current that flows through the normally non-conducting transistor during such intervals opposes the useful output of the inverter and, hence, represents wasted power. Since such current tends to flow over a greater and greater portion of the operating cycle as frequency increases, the frequency can be raised in such inverters only at the cost of reduced efficiency.

One object of the present invention is to permit the switching frequency of a transistor inverter to be increased without any important sacrifice in efficiency.

Another object of the invention is to permit the efficiency of a transistor inverter to be raised without any necessity for reducing its switching frequency.

Still another object is to permit such increases in switching frequency or efficiency in as simple, reliable, and inexpensive a manner as possible.

In accordance with a principal feature of the invention, a pair of control transistors are used in a transistor inverter to accelerate the switching of each power transistor back into its non-conducting state as soon as the other power transistor begins to conduct. Each control transistor takes advantages of fed back voltage or current changes which are additive in effect during switching intervals and cooperates with the other control transistor to reduce unwanted current flow through the nominally non-conducting power transistor to a minimum. The additional circuitry is simple, reliable, and inexpensive and may be employed either to increase converter switching frequency without loss of efficiency or to improve inverter efficiency without reducing switching frequency.

In at least one preferred embodiment of the invention, the power transistors have their emitter-collector paths connected to supply current from the direct-current source through the feedback transformer primary winding in respectively opposite directions, a pair of control transistors are connected with their emitter-collector paths each connected in parallel with the emitter-base path of a respective one of the power transistors, and positive feedback paths are connected from the transformer secondary winding to the emitter-base paths of each of the control transistors to drive the power transistors into conduction alternately and to switch each power transistor back into its non-conducting state as soon as the other power transistor begins to conduct. The voltage or current changes applied to the base-emitter path of each control transistor are additive as the opposite power transistor begins to conduct, accelerating the transition of its own power transistor back to its non-conducting state.

A more complete understanding of the invention can be obtained from a study of the following detailed description of one specific embodiment. The single figure of the drawing is a schematic diagram of that embodiment, incorporated as one element of a direct-current converter.

In the illustrated embodiment of the invention, a pair of p-n-p transistors 1 and 2 have their emitter electrodes connected to the positive terminal of a direct-current source 3. Their collector electrodes are connected to opposite ends of the primary winding 4 of a saturable feedback transformer 5. The negative terminal of source 3 is connected to the midpoint of winding 4. Power transistors 1 and 2 are switches and their emitter-collector paths are shifted back and forth between conducting and substantially non-conducting states in phase opposition to one another by positive feedback from the secondary winding 6 of transformer 5. Voltage feedback is employed in the illustrated embodiment and is obtained with the aid of a direct connection from one end of winding 6 to the base electrode of transistor 2 and a timing capacitor 7 and resistor 8 connected to series between the other end of winding 6 and the base electrode of transistor 1. The relative polarities of windings 4 and 6 of transformer 5 are as illustrated by the dots. To permit the emitter-base paths of power transistors 1 and 2 to receive biasing current from source 3, a resistor 9 is returned to the negative terminal of source 3 from the base electrode of transistor 1 and a resistor 10 is returned to the same point from the base electrode of transistor 2.

In accordance with a principal feature of the invention, a pair of p-n-p control transistors 11 and 12 are connected to switch each power transistor back into its non-conducting state as soon as the other power transistor begins to conduct. Control transistor 11 has its emitter electrode connected directly to the base electrode of power transistor 1 and its collector electrode connected directly to the emitter electrode of power transistor 1. Control transistor 12 is connected in a similar manner between the emitter and base electrodes of power transistor 2. The base electrode of control transistor 11 is connected through a resistor 13 to the end of secondary winding 6 joined to the base electrode of power transistor 2. The base electrode of control transistor 12 is similarly connected through a resistor 14 to the other end of secondary winding 6. Resistors 13 and 14 fix the amount of feedback to the base electrodes of control transistors 11 and 12.

The equipment thus far described constitutes the inverter portion of the direct-current converter. In operation, the inverter generates a substantially square alternating-current wave with a nominal frequency of 2500 cycles per second. This wave appears on both windings of feedback transformer 5 and is taken from primary winding 4 and applied through a voltage step-up transformer 15 to a full-wave rectifier 16. The resulting direct current is passed through a low-pass filter 17 to a load 18.

In the operation of the illustrated embodiment of the invention, transistors 2 and 11 are conducting when transistors 1 and 12 are cut off. Power transistor 2 is in its conducting (saturated) state, permitting current from source 3 to flow in the lower portion of primary winding 4. The voltage on primary winding 4 is positive at the dot, causing a voltage to be induced on secondary winding 6 which is positive at the dot. As a result, current flows from secondary winding 6 through a path which includes timing capacitor 7 and resistor 8, the emitter-base junction of control transistor 11, and resistor 13. The emitter-base junction of control trasnistor 11 is thus forward biased and its emitter-collector path is held in the conducting state. Additional current from secondary winding 6 then flows through a path which includes timing capacitor 7 and resistor 8, the emitter-collector path of control transistor 11, and the emitter-base junction of power transistor 2, holding the emitter-collector path of the latter transisor in its conducting state. The emitter-base junction of power transistor 1 is reverse biased by the voltage drop across the emitter-collector path of control transistor 11, maintaining power transistor 1 in its non-conducting state.

Switching takes place in the illustrated embodiment of the invention when the voltage fed back from secondary winding 6 to the emitter-base path of control transistor 11 is no longer sufficient to hold the emitter-collector path of that transistor in its conducting state. This voltage decreases gradually as timing capacitor 7 charges and drops sharply when feedback transformer 5 saturates. As soon as the current which this voltage causes to flow through the emitter-base junction of control transistor 11 drops below a critical value, control transistor 11 switches to its non-conductiing state. The reverse bias on the emitter-base junction of power transistor 1 is thus removed and replaced by the forward bias from source 3. Current flows from source 3 through the emitter-base junction of power transistor 1 and resistor 9.

Power transistor 2 tends to switch to its non-conducting state as control transistor 11 cut off because of reduced current through its own emitter-base junction. The process is accelerated with the aid of the present invention. As soon as power transistor 1 switches to its conducting (saturated) state, the current from source 3 flowing in primary winding 4 reverses and becomes positive at the end of primary winding 4 remote from the dot. The same reversal takes place in secondary winding 6. As a result, a rapidly rising potential is fed back to the emitter electrode of control transistor 12 and a rapidly falling potential is fed back to the base electrode. The effects of the respective rising and falling potentials are additive, causing control transistor 12 to switch rapidly into its conducting state. The low impedance emitter-collector path of control transistor 12 permits current from secondary winding 6 to pass through the emitter-base junction of power transistor 1, driving that transistor more heavily into conduction. At the same time, however, it places a reverse bias across the emitter-base junction of power transistor 2, switching the emitter-collector path of that transistor rapidly out of conduction.

The rapid operation of control transistor 12 in switching control transistor 2 back to its non-conducting state minimizes any tendency for current from source 3 to continue to flow through the emitter-collector path of power transistor 2 after power transistor 1 has begun to conduct. There is, therefore, no significant power loss during switching transients. Advantage may be taken of the improved performance either by increasing the switching frequency of the inverter to permit use of components with smaller physical dimensions in low-pass filter 17 or by retaining the switching frequency used in the prior art and realizing a considerable improvement in operating efficiency.

After transistors 1 and 12 begin to conduct, they continue to conduct until the voltage fed back to the emitter-base path of control transistor 12 falls sufficiently to cut control transistor 12 off again. Transistors 2 and 11 remain cut off during this interval. When control transistor 12 cuts off, control transistor 11 switches rapidly back into its conducting state and minimizes power loss by cutting off power transistor 1. The cycle is continuous, producing a substantially square alternating-current output wave on primary winding 4 of feedback transformer 5.

It is to be understood that the above-described arrangement is illustrative of the application of the principles of the invention. Numerous other arrangements may be devised by those skilled in the art without departing from the spirit and scope of the invention.

What is claimed is:

1. An inverter which comprises a source of direct input voltage, a transformer having a primary winding and a secondary winding, a pair of alternately conducting power transistors each having its emitter-collector path connected from one side of said source to a respectively opposite end of said primary winding, the other side of said source being connected to an intermediate tap on said primary winding and said secondary winding being connected between the base electrodes of said power transistors, a pair of control transistors each having its emitter-collector path connected directly across the emitter-base path of a respective one of said power transistors, a positive feedback path from one end of said secondary winding to the base electrode of one of said control transistors, and a positive feedback path from the other end of said secondary winding to the base electrode of the other of said control transistors, whereby each of said control transistors switches the opposite one of said power transistors to its non-conducting state as soon as the other of said power transistors switches to its conducting state.

2. An inverter which comprises a source of direct input voltage, a transformer having a primary winding and a secondary winding, a pair of alternately conducting power transistors of the same conductivity type each having its emitter electrode connected to one side of said source and its collector electrode connected to a respectively opposite end of said primary winding, the other side of said source being connected to an intermediate tap on said primary winding and said secondary winding being connected between the base electrodes of said power transistors, a pair of control transistors of the same conductivity type as said power transistors each having its emitter electrode connected directly to the base electrode and its collector electrode connected directly to the emitter electrode of a respective one of said power transistors, a positive feedback path from one end of said secondary winding to the base electrode of one of said control transistors, and a positive feedback path from the other end of said secondary winding to the base electrode of the other of said control transistors, whereby each of said control transistors switches the opposite one of said power transistors to its non-conducting state as soon as the other of said power transistors switches to its conducting state.

References Cited by the Examiner

UNITED STATES PATENTS

| | | | |
|---|---|---|---|
| 2,945,965 | 7/1960 | Clark | 331—113 |
| 3,015,771 | 1/1962 | Mesenhimer | 331—113 |
| 3,040,269 | 6/1962 | Hemphill et al. | 331—113 |
| 3,098,201 | 7/1963 | Smedema et al. | 331—113 |

ROY LAKE, *Primary Examiner.*